June 5, 1962 A. F. MacDONALD 3,038,070
RADIO RECEIVER APPARATUS
Filed May 26, 1958
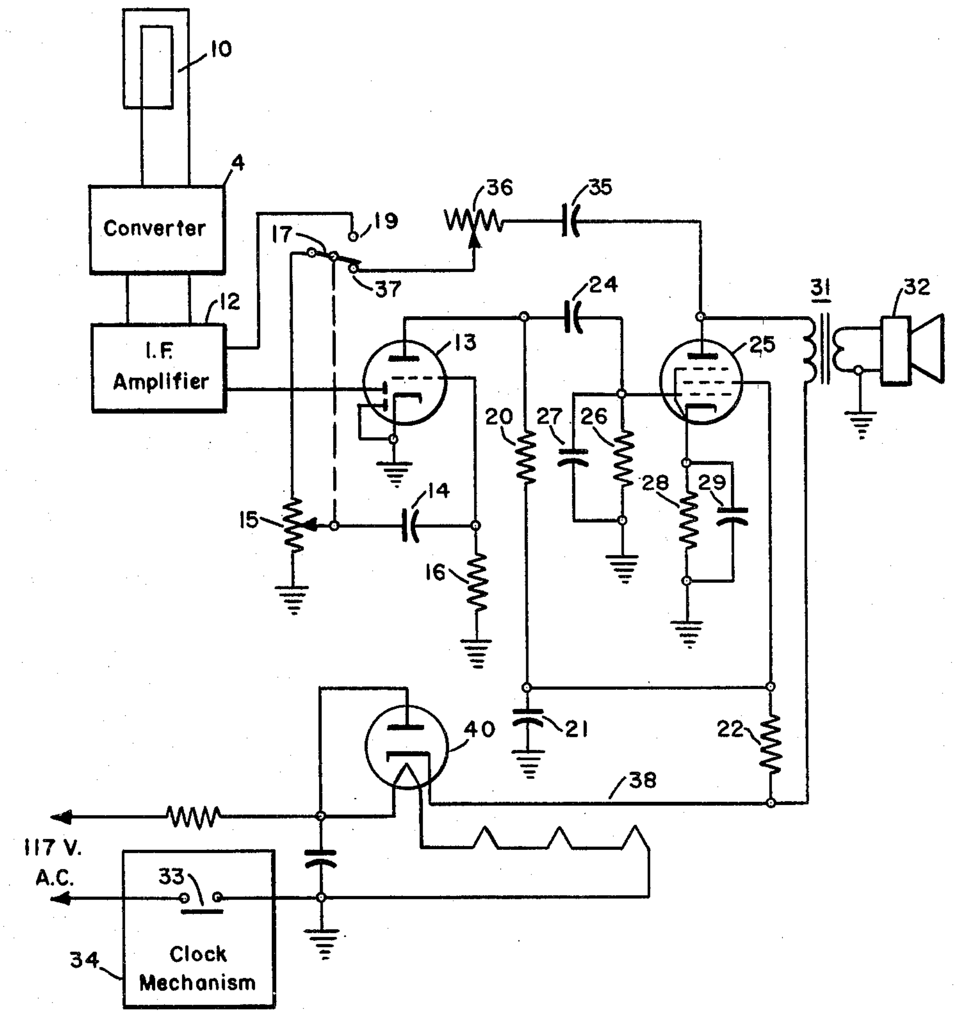
WITNESSES
Leon J. Taga
James F. Young
INVENTOR
Alden F. Mac Donald
BY Benjamin DeWitt
ATTORNEY United States Patent Office 3,038,070
Patented June 5, 1962

3,038,070
RADIO RECEIVER APPARATUS

Alden F. MacDonald, Edison Township, Middlesex County, N.J., assignor to Westinghouse Electric Corporation, East Pittsburgh, Pa., a corporation of Pennsylvania
Filed May 26, 1958, Ser. No. 737,673
5 Claims. (Cl. 250—20)

This invention relates to radio receivers that include clocks for sounding alarms or playing music or the like at predetermined times.

Prior radio receivers including alarm clocks have used annoying sounding buzzers that have gone off at very high sound levels.

This invention provides a radio receiver with a pleasant sounding alarm which can be set at any desired level by the user. In one embodiment of this invention, this is accomplished by connecting the anode of the power amplifier tube of the receiver, through a feedback circuit including a series-connected coupling capacitor and variable resistor, to the control grid of the first audio tube of the receiver. A two-position switch connects either the radio frequency circuit or the feedback circuit to the grid of the first audio tube. The audio circuit oscillates at an audio frequency dependent upon the values of the capacitor and resistor in the feedback circuit, and its pitch or tone can be adjusted by adjustment of the variable resistor. The volume control of the receiver is used to control the loudness of the alarm when the control switch is at the alarm position.

An object of this invention is to provide a radio receiver having an alarm clock with a pleasant sounding alarm, the volume of which can be adjusted by the user.

Another object of this invention is to provide a radio receiver having an alarm clock with a pleasant sounding alarm, the volume and tone of which can be adjusted by the user.

A further object of this invention is to provide a clock-radio receiver combination having an alarm means featuring great economy of structure and circuitry.

This invention will now be described with reference to the annexed drawing which is a circuit schematic of one embodiment of this invention. The circuit shows a conventional A.C.-D.C. radio reeciver modified to include this invention. The receiver has a signal pick-up loop 10 connected to a converter 4 which is connected to an IF amplifier 12. One output lead of the IF amplifier 12 is connected to one diode of a dual-diode-triode tube 13 which may be a 12AV6 and which serves as a demodulator and a first audio amplifier tube. The other diode of the tube 13 is connected to its cathode and to ground. The control grid of the tube 13 is connected through coupling capacitor 14 to the slider of potentiometer 15, and through grid resistor 16 to ground. One end of the potentiometer 15 is grounded, and its other end is connected to control switch 17. The switch 17, in radio receiving position, would be placed on switch contact 19 which is connected to the other output lead of the IF amplifier 12.

The anode or plate of the tube 13 is connected through plate resistor 20, and through dropping resistor 22 to B+, and is connected through coupling capacitor 24 to the control grid of pentode tube 25 which may be a 50C5. The control grid of the tube 25 is also connected through grid resistor 26, shunted by bypass capacitor 27, to ground. The cathode of the tube 25 is connected through bias resistor 28, shunted by bypass capacitor 29, to ground. The suppressor grid of the tube 25 is connected to its cathode. The screen grid of the tube 25 is connected through the dropping resistor 22 to B+. The plate of the tube 25 is connected through the primary winding of output transformer 31 to B+. The secondary winding of the output transformer 31 is connected to the voice coil of the loud speaker 32.

The plate of the tube 25 is also connected through feedback capacitor 35 and variable resistor 36 to contact 37 of the switch 17. When the switch 17 is on contact 37, the plate of the tube 25 is connected in a positive or regenerative feedback circuit including the capacitor 35, the resistor 36, the contact 37, the switch 17, the potentiometer 15, the slider of the latter, and the capacitor 14, to the control grid of the tube 13, causing the audio amplifier circuit to oscillate at a frequency depending upon the value of the feedback capacitor 35 and the value of the feedback resistor 36 in the feedback loop. The resistor 36 can be adjusted to adjust the pitch of the alarm signal to one most pleasing to the user. The volume of the alarm signal can be adjusted by adjustment of the potentiometer 15.

When the switch 17 is on the contact 19, the grid-cathode circuit of the tube 13 is connected to the demodulator circuit of the receiver including the output leads of the IF amplifier 12 and the diode of the tube 13 to which one of such leads is connected. When the switch 17 is on the contact 37, the grid-cathode circuit of the tube 13 is connected to the feedback circuit, and the audio amplifier is converted into an audio oscillator, producing oscillations which through the loud speaker 32 produce a pleasant, controllable alarm signal. The switch 17 comprises a double acting switch of conventional design which is ganged with the volume control so that a choice of alarm or radio may be selected by the user. When switch 17 is on contact 19 the volume control is operative in the usual manner to control the loudness of the received radio intelligence signal. When switch 17 is on contact 37 the control 15 is operative to control the loudness of the alarm signal generated by the feedback loop.

B+ potential is supplied to the receiver circuits over a conductor 38 from a conventional rectifier device 40 which is energized from the usual 117 volt line.

In series with one side of the A.C. line voltage connection to the rectifier device 40 there is provided a switch 33 of a conventional alarm clock mechanism 34. When the alarm clock switch 33 is actuated by the arrival of a time for which the clock is preset the rectifier device 40 and the amplifier circuits will be energized to produce either an alarm signal or a radio intelligence depending upon the preset position of the switch 17.

While the present invention has been shown in one form only, it will be obvious to those skilled in the art that it is not so limited but is susceptible to various changes and modifications without departing from the spirit and scope thereof.

I claim as my invention:

1. In combination with a radio receiver for reception of a broadcast signal having a demodulator circuit, an audio amplifier, a sound reproducer connected to said amplifier, and a clock having an alarm switch, a feedback circuit for causing said amplifier to oscillate, means including a control switch for connecting said amplifier to said demodulator circuit at one position of said control switch and for connecting said amplifier to said feedback circuit at another position of said control switch to make said amplifier non-responsive to said broadcast signal, and circuit means connected with said alarm switch for applying energizing potential to said audio amplifier at the end of a preselected time interval.

2. In a radio receiver, an audio amplifier having an input circuit and having an output circuit, means for applying demodulated radio signals to said input circuit, a sound reproducer coupled to said output circuit, an alarm clock having an alarm switch connected to energize said amplifier at a preselected time, a two-position control switch, and a feedback circuit including said control switch for connecting said output and input circuits together to cause said amplifier to oscillate and to make said amplifier non-responsive to said radio signal whereby with said control switch at one position said reproducer emits alarm signals at said preselected time and with said control switch at the other position said reproducer emits sound corresponding to said radio signals.

3. In an alarm clock radio means for receiving sound modulated radio waves including a demodulator, an audio frequency network and a sound reproducer coupled to said network; means operatively associated with said network for making said audio frequency network non-responsive to said received sound modulated radio waves and providing regenerative feedback oscillation therein thereby to cause an audible alarm signal to be emitted from said reproducer when said network is energized; switch means connected to control the energization of said network; and a clock type timer operatively associated with said switch means for actuating the same at a preselected time.

4. In an alarm clock radio, means for receiving sound modulated radio waves including a demodulator, an audio frequency network and a sound reproducer coupled to said network; means operatively associated with said network for making said audio frequency network non-responsive to said sound modulated radio waves and providing regenerative feedback oscillation therein thereby to cause an audible alarm signal to be emitted from said reproducer when said network is energized; switch means connected to control the energization of said network; a clock type timer operatively associated with said switch means for actuating the same at a preselected time, and means for selectively disabling said regenerative feedback means so that said audio frequency network is conditioned to translate intelligence signals corresponding to the modulation of said radio waves thereby causing audible intelligence to be emitted from said reproducer when said network is energized.

5. In a clock-radio combination, means for receiving radio waves including a demodulator, a succeeding audio frequency network, and a sound reproducer; means operatively associated with said audio network for providing regenerative feedback and oscillation therein; switch means connected to control the application of operating voltages to said radio wave receiving means; a timer having means for closing said switch means at a preselected time, and a control switch for preselectively enabling said regenerative feedback means while disabling said audio frequency network with respect to said radio waves and disabling said regenerative feedback means while enabling said audio frequency network with respect to said radio waves whereby said reproducer emits oscillatory tone signals at said preselected time and said audio frequency network is made non-responsive to said radio waves when said feedback means is preselectively enabled and emits sound intelligence at said time with said feedback means being disabled and said audio frequency network being responsive to said radio waves.

References Cited in the file of this patent

UNITED STATES PATENTS

| | | |
|---|---|---|
| 1,955,558 | Nelson | Apr. 17, 1934 |
| 2,367,327 | Beers | Jan. 16, 1945 |
| 2,367,378 | Schick | Jan. 16, 1945 |
| 2,447,156 | Brittain | Aug. 17, 1948 |

FOREIGN PATENTS

| | | |
|---|---|---|
| 264,468 | Switzerland | Jan. 3, 1950 |

OTHER REFERENCES

RCA Service Data, 1954, No. 17, for A-C Operated Clock Radio, models 6-C-591, 5-C-592.